July 2, 1968  H. R. MOORE  3,391,363
TRANSFORMER WINDING HAVING COOLING DUCTS
Filed April 21, 1966

United States Patent Office 3,391,363
Patented July 2, 1968

3,391,363
TRANSFORMER WINDING HAVING
COOLING DUCTS
Harold R. Moore, Muncie, Ind., assignor to Westinghouse
Electric Corporation, Pittsburgh, Pa., a corporation of
Pennsylvania
Filed Apr. 21, 1966, Ser. No. 544,282
10 Claims. (Cl. 336—58)

ABSTRACT OF THE DISCLOSURE

Electrical inductive apparatus including a winding having a plurality of pancake coils. The pancake coils each include first and second sections, each having first and second major opposed surfaces. The two sections of each pancake coil are disposed in spaced relation, with the second major surface of the first section being adjacent the first major surface of the second section, to provide a cooling duct between the sections of each pancake coil. Channel insulating members having tapered leg portions connected by a back portion are disposed about the inner and outer edges of each pancake coil. Insulating washer members are disposed in spaced relation adjacent the first and second major surfaces of the first and second sections of each pancake coil, to provide additional cooling ducts.

---

In applying electrical insulation to the windings of electrical power transformers, several important factors must be considered. The winding must be insulated from ground, usually with solid insulating means such as pressboard, with the minimum thickness of the solid electrical insulating means being determined by its dielectric strength and the steady state voltage magnitude. The heat generated in the windings must be quickly and efficiently removed, in order to prevent the winding temperature from exceeding a predetermined maximum value, determined by the type of electrical insulation utilized. This is usually accomplished by a cooling duct arrangement in the solid insulation, and the circulation of a dielectric fluid, such as oil or sulfur hexafluoride ($SF_6$). And, the winding must have adequate electrical insulation to accommodate surge or impulse voltages and oscillatory transient voltages produced by the impulse voltages. The manner in which surge potentials are distributed across an electrical winding, and the magnitude of transient oscillatory voltages, depend upon the arrangement of the solid insulation which insulates the winding turns and coils from one another and from ground, the cooling duct arrangement, and the fluid dielectric used for cooling the winding. Therefore, the total amount of insulation is not determined solely by the voltage magnitude to be insulated, but also by the particular arrangement of the solid insulation and means for cooling the electrical windings. If the particular arrangement of solid insulation and fluid dielectric does not promote uniform stressing of the insulation during surge or impulse voltages, some areas will require additional insulation which may increase the mean length of the magnetic circuit and the mean length of the winding turns, substantially increasing the cost of the apparatus and deleteriously affecting the efficiency and regulation of the apparatus. Further, a non-uniform distribution of surge potential leads to transient voltage oscillations of great magnitude as the voltage distribution changes from capacitive to inductive. Insulation must be provided to insulate against these high transient voltages, which also deleteriously affects the cost, regulation and efficiency of the apparatus.

In prior art winding and insulation arrangements, it has been determined that tight fitting channels of solid insulation applied to both the inner and outer edges of the coils which make up the windings, is advantageous in accommodating the high electrical stresses at the edges of the coils. However, many prior art arrangements result in excessive hot spot temperatures due to the blanketing effect of the channels. Further, high stress concentrations occur at the edges of the insulating channels where they terminate in cooling ducts, due to the transition from solid to fluid insulation and their different dielectric constants.

Still other prior art arrangements divide each coil into two spaced parallel connected sections with a cooling duct between the coil sections and solid insulation between adjacent coils. This arrangement has many advantages, as the steady-state stress across the coil duct is substantially negligible due to the fact that the voltage on each coil section at any adjacent point is substantially the same. This arrangement however, has some disadvantages, as the cooling duct between coil sections must be relatively large in order to adequately cool the coil sections, resulting in poor distribution of impulse voltages across the winding and across the cooling duct, due to the characteristic of impulse voltages whereby they are distributed across two media inversely proportional to the capacitance of the media. The large ducts and lower dielectric constant of the insulating fluid, compared with the dielectric constant of the solid insulating means, provides a lower capacitance in the cooling ducts than is provided by the solid insulating means between the coils, causing high stresses across the cooling ducts which may ionize the dielectric fluid. Also, the solid insulation used between adjacent coils is costly, and many different specially prepared shapes are usually required in order to fit the solid insulating members together to form a substantially void-free structure.

It would be desirable to be able to use tight fitting channels on the coil edges, and the spaced parallel connected coil arrangement of the prior art, without the disadvantages of the prior art arrangements.

Accordingly, it is an object of the invention to provide a new and improved winding, insulating, and cooling duct arrangement for electrical inductive apparatus.

Another object of the invention is to provide a new and improved winding, insulating, and cooling duct arrangement for electrical inductive apparatus which reduces stress concentrations at the termination of the solid insulation in the cooling ducts.

Still another object of the invention is to provide a new and improved transformer having a winding, insulation, and cooling duct arrangement in which the windings are efficiently cooled without resorting to cooling duct widths which may cause ionization of the fluid dielectric.

A further object of the invention is to provide a new and improved transformer which has a winding, solid insulation, and cooling duct arrangement which more uniformly stresses the solid insulation and cooling ducts, and which requires a minimum of solid insulation between adjacent coils of the winding.

Briefly, the present invention accomplishes the above cited objects by providing a new and improved winding, cooling duct, and solid insulation arrangements for electrical transformers. The coils which make up the winding are divided into two spaced, parallel connected sections, with a cooling duct being disposed between the sections, which cools the inner adjacent major sides of the coil sections. Cooling ducts are also provided on the outer major sides of the coil sections, thus making it possible for the width of the cooling ducts, both inner and outer, to be reduced to a value which will prevent the fluid cooling dielectric in the ducts from ionizing.

Tight fitting channels of solid insulation are applied to the inner and outer edges of each coil, with the channels having tapered leg portions which extend along certain outer major surfaces of each coil section for a predetermined distance, and terminate in the outer cooling ducts. The tapered channel legs provide a smooth transition from the higher dielectric constant solid insulation to the lower dielectric constant fluid insulation, eliminating stress concentrations in this area. The outer cooling ducts proceed along the outer major surfaces of the coil sections until reaching the tapered legs of the insulating channels, at which point the solid insulating members which form the outer cooling ducts allow the ducts to proceed away from the highly stressed edges of the coils.

A duct for the dielectric fluid is also provided between adjacent coils which aids in distributing surge potentials more uniformly across the winding, and makes it possible to use a minimum number of conventionally shaped solid insulating members.

Further objects and advantages of the invention will become apparent from the following detailed description, taken in connection with the accompanying drawings, in which.

Figure 1:
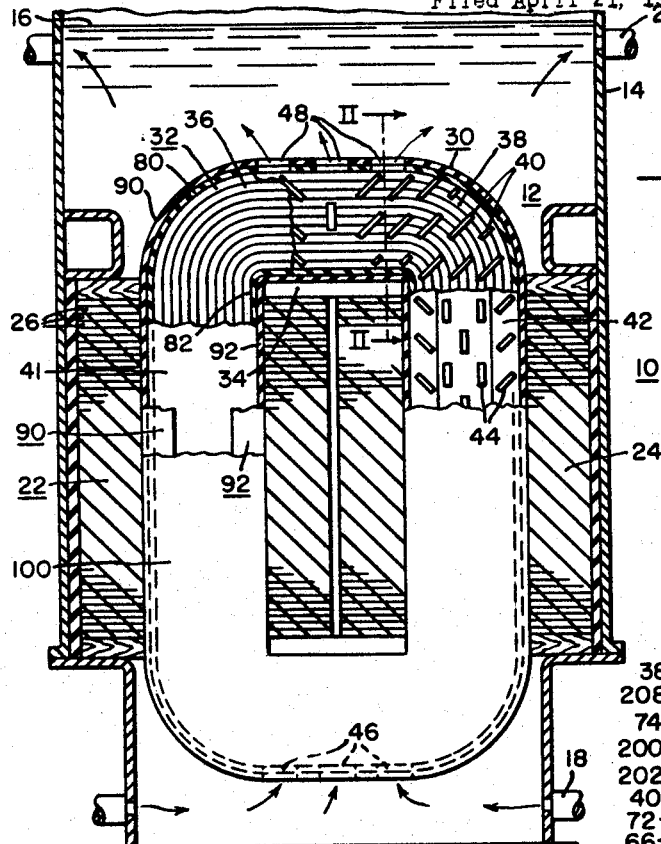
FIGURE 1 is an elevational view, partially in section, illustrating a transformer which utilizes the teachings of the invention.

Referring now to the drawings, and FIG. 1 in particular, there is shown a transformer 10 constructed according to the teachings of the invention. Transformer 10 includes a core-winding assembly 12 disposed in a tank or casing 14, which is filled to a suitable level 16 with a cooling and insulating dielectric fluid, such as oil. Casing 14 may have suitable inlet and outlet openings 18 and 20, respectively, connected to external heat exchanger means (not shown) for circulating and cooling the dielectric fluid. The fluid flow is shown by the arrows in FIG. 1.

The core-winding assembly 12 is of the shell-form type, and may be single or polyphase. The core-winding assembly 12 includes magnetic core sections 22 and 24, which include a plurality of stacked metallic laminations 26, formed of a suitable magnetic material, such as grain oriented silicon steel. The core-winding assembly 12 also includes high and low voltage electrical winding structures, shown generally at 30, which are disposed in inductive relation with the magnetic core sections 22 and 24. The high and low voltage windings may be of the isolated type, or the autotransformer type.

The electrical windings 30 include a plurality of disc or pancake type spirally wound coils, such as coil 32, which has an opening 34 for receiving leg members of the magnetic core sections 22 and 24. The plurality of pancake coils are stacked in side-by-side relation with their core openings in substantial alignment.

In general, each pancake coil, such as coil 32, is divided into two spaced spirally wound sections 36 and 38, with each section being wound from an insulated electrical conductor, such as copper or aluminum, having one or more strands. Each of the coil sections 36 and 38 have two major opposed surfaces connected by the opening in the coils and by the outer edges of the coils. The coil sections 36 and 38 are separated by a plurality of insulating spacer blocks 40, formed of pressboard or any other suitable insulation, which separate the winding sections 36 and 38 to form a cooling duct for flow of the cooling dielectric immediately adjacent the inner major surfaces of the coil sections.

Additional cooling ducts adjacent the remaining or outer major surfaces of coil sections 36 and 38 are formed by insulating washer members 41 and 42, which may be formed of pressboard or other suitable electrical insulation. Insulating washer members 41 and 42 have a plurality of insulating spacer members secured thereto, formed of pressboard or other suitable insulation, such as the spacer members 44 shown on insulating washer member 42.

Winding structure 30 also includes insulating channel members 80 and 82 which surround the outer and inner edges of the coils which make up the windings, in a tight fitting manner, and insulating channels 90 and 92 which are disposed over the insulating channels 80 and 82, in a tight fitting manner, as will be hereinafter explained.

Winding structure 30 has a plurality of openings 46 and 48 disposed at the bottom and top portions of the winding structure, respectively, to allow the cooling dielectric to enter the cooling ducts in the various pancake coils, circulate over the various coil sections, and leave the winding structure, where the heated fluid may be circulated through external heat exchanger means, if desired. The flow of the cooling dielectric may be by thermal siphon, due to the inherent thermal head of the fluid, or it may be forced flow due to suitably disposed pumping means (not shown).

Figure 2:
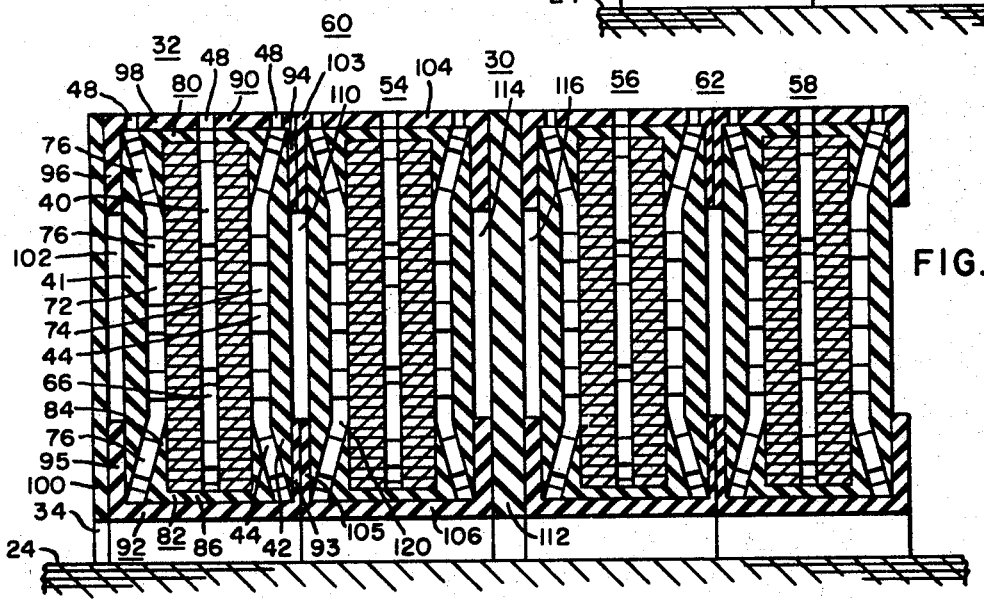
FIG. 2 is a view of a portion of the transformer shown in FIG. 1 taken along the line II—II, illustrating an embodiment of the invention.

In order to more clearly understand the invention, a section through winding structure 30, taken along the line II—II in FIG. 1, is illustrated in FIG. 2. FIG. 2 illustrates the coil 32, as well as a plurality of additional coils 54, 56 and 58. Coils 32 and 54 may be part of a low voltage winding 60, and coils 56 and 58 may be part of a high voltage winding 62. Each winding 60 and 62 may have a large plurality of coils, depending upon the requirements of the application, with only four pancake coils being shown in FIG. 2 for purposes of simplicity.

Each of the coils, such as coil 32, is of the pancake type, including at least two spirally wound layers of conductors which are spaced apart to form first and second coil sections 36 and 38 respectively. Each coil section has first and second major opposed surfaces or sides joined by the inner and outer edges of the coil sections. A plurality of insulating members 40, which are generally formed of pressboard, separate the two coil sections, forming a cooling duct 66 for flow of the fluid dielectric immediately adjacent the facing major surfaces of coil sections 36 and 38 which form the walls of the cooling duct. An outlet 48 is disposed in communication with cooling duct 66 to allow heated fluid dielectric, which entered the openings 46 in winding structure 30, shown in FIG. 1, to escape the cooling duct and circulate to the external heat exchanger means.

Figure 3:
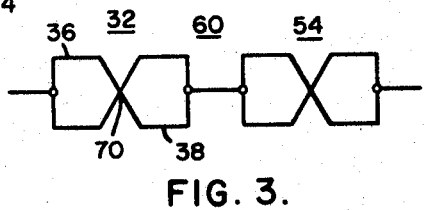
FIG. 3 is a schematic representation illustrating how the electrical coils of the transformer shown in FIG. 1 may be connected.

The two coil sections of each pancake coil of the winding structure 30 may be connected in parallel, as shown schematically in FIG. 3, with the parallel connected conductors being transposed, if desired, as shown at transposition point 70 in FIG. 3. By dividing each pancake coil into two or more parallel connected sections, eddy currents are minimized, and by transposing the conductors, circulating currents in the parallel paths may also be minimized. The practice of separating the pancake coils into two or more spaced sections also provides additional coil surface, which facilitates cooling of the coil. It will be noted that the steady-state stress in the cooling duct 66 between the coil sections is negligible, because the potential difference across any point in the duct is substantially zero.

The cooling duct 66 and its dielectric cooling fluid, however, are subjected to electrical stress when surge or impulse potentials are applied to the winding. Therefore, it is imperative that the width of the duct 66 be made as small as possible, to prevent stress concentration which may ionize the dielectric cooling fluid. Surge and impulse potentials are distributed across two media inversely proportional to their capacitance, and therefore inversely proportional to their dielectric constants, if the media are of equal thicknesses. Since the dielectric constant of the conventional cooling fluid, oil, is approximately 2.2, and the dielectric constant of the conventional solid insulation, pressboard, is approximately 4.5, electrical stresses will tend to concentrate in the oil, which has a lower dielectric strength than pressboard. If the pancake coils, such as coil 32, were to depend solely upon cooling duct 66 for its cooling, the cooling duct would have to be in the order of 7/16 of an inch wide, in order to provide a sufficient quantity of cooling oil. A cooling duct having a width dimension of 7/16 of an inch, with the remaining insulation being pressboard, is sufficient to cause ionization of the oil in the cooling duct upon surge potentials being applied to the winding. Therefore, prior art arrangements which utilize this particular arrangement of cooling duct and solid insulation are forced to dispose a centrally located insulating barrier member in the cooling duct 66, which further increases the space required in the duct. This invention does not depend solely upon cooling duct 66 for cooling of the pancake coil, as will hereinafter be explained. Thus, the width of cooling duct 66 may be reduced to a maximum thickness of ¼ of an inch in certain embodiments of the invention, and 3/16 of an inch in other embodiments, which precludes the ionization of the oil in the ducts when used with a structure arranged according to the teachings of this invention.

Thus, summarizing to this point, each pancake coil, such as coil 32, has at least two spaced parallel connected coil sections, with the space between the coil sections being utilized as a coil cooling duct whose maximum width is ¼ or 3/16 of an inch, depending upon the particular embodiment of the invention.

In order to provide the additional cooling required by the coil sections 36 and 38, since cooling duct 66 is too narrow to lower the maximum hot spot temperature of the pancake coil to within an acceptable limit, additional cooling ducts 72 and 74 are provided immediately adjacent the outer major surfaces of coil sections 36 and 38. An insulating washer member 41 formed of pressboard, or other suitable insulating material, is provided in spaced relation with the outer major surface of coil section 36, and spaced therefrom by a plurality of insulating spacer members 76, formed of pressboard, or other suitable insulating material, which forms cooling duct 72. In like manner, an insulating washer member 42 is disposed in spaced relation with the outer major surface of coil section 38, and spaced therefrom by a plurality of insulating spacer members 44, which form the cooling duct 74. Cooling ducts 72 and 74 are also in communication with the inlets 46 and outlets 48 associated with the electrical winding structure 30.

The outer cooling ducts 72 and 74, like the inner cooling duct 66, are limited, in this embodiment of the invention, to a maximum width of 3/16 of an inch, to prevent the oil in the ducts from ionizing upon impulse voltages. Since coil sections 36 and 38 are cooled on each major side, thin ducts having a maximum width of substantially 3/16 of an inch are adequate to keep the hot spot temperature of the pancake coil within an acceptable limit.

The dielectric stresses surrounding the pancake coil 32 are greatest immediately adjacent the edges of the pancake coil which are adjacent the core opening, and the outside edges of the coil. These high stress areas should be carefully insulated with a tight fitting solid insulating material having a high dielectric strength, such as pressboard, and this high electrical stress should be kept out of the cooling ducts in order to prevent the oil from ionizing. Further, the tight fitting channels should not contact both major surfaces of any one coil section, due to the blanketing effect of the insulation, which may raise the temperature of the coil at this point above the safe hot spot temperature for the particular solid insulation being utilized.

Accordingly, tight fitting insulating channel members 80 and 82 are disposed over the inner and outer edges of the pancake coils. The channel members 80 and 82 have leg portions such as leg 84 on channel member 82, which extend inwardly from a connecting or back portion 86. The connecting portion 86 extends across the inner and outer ends of the coil sections 36 and 38, and the leg portions 84 extend for a predetermined distance along the outer major surfaces of the coil sections 36 and 38. The edges of the inner major surfaces are not covered by the solid insulating channel members. Nor do they need to be covered, as the electrical stress in this area is low due to the parallel connection of the coil sections.

If the leg portions 84 of the channel members 80 and 82 were to be terminated with a sharp corner in the cooling ducts 72 and 74, a large concentration of electrical stress would be created on the corner which may cause ionization of the oil. To eliminate this concentration of electrical stress at the termination of the channel members 80 and 82, the leg portions 84 are tapered, starting with a predetermined maximum thickness at the connecting or back portion 86 of the channel members and tapering to a minimum dimension at the outer end of the leg portion, away from the highly stressed corners of the coil where the stress is uniform. This arrangement gradually decreases the effective dielectric constant of the solid insulating channel member and cooling fluid, from a maximum at the coil edge to a minimum at the outer end of the channel leg portion 84. This gradual change in dielectric constant eliminates any large concentrations of electrical stress in the cooling duct.

The cooling dielectric, such as oil, disposed in the outer cooling ducts 72 and 74, must be free to flow in an unobstructed manner into the outer cooling ducts from the bottom of the winding structure 30, and out of the outer cooling ducts at the top portion of the winding 30, and the cooling ducts 72 and 74 are maintained within the maximum width dimension of 3/16 of an inch, in this embodiment of the invention, in order to preclude ionization of the oil. This may be accomplished, as shown in FIG. 2, by providing insulating washer members 41 and 42 in which at least their sides which face the coil sections are tapered adjacent the tapered leg portions 84 of channel members 80 and 82. Spacer members 76 may therefore be of a predetermined uniform thickness, and ducts 72 and 74 are directed away from the high stressed corners of the coil. In other words, insulating washer members 41 and 42 have their surfaces which face the outer major surfaces of the coil sections and which face the tapered leg portions of the channel member, shaped to be substantially parallel therewith, directing the cooling ducts 72 and 74 along the outer major surfaces of the coil sections 36 and 38 until reaching the tapered leg portion 84 of channel members 80 and 82. At the tapered leg portion, the ducts 72 and 74 are directed outwardly along the leg of the channel members where they may be joined by the inlet and outlet openings 46 and 48, respectively, in areas of low dielectric stress.

Certain prior art insulation arrangements utilize tightly fitted solid insulation between adjacent pancake coils. This has the advantage of eliminating oil pockets which may be subject to ionization, but has the disadvantage of requiring costly, specially formed or machined solid insulating pieces which must accurately fit together. This arrangement also has the disadvantage of providing areas of maximum obtainable dielectric constant and therefore capacitance, which tends to increase the stress across the cooling ducts, which are areas of lower dielectric constant and lower capacitance. This invention eliminates the requirement of utilizing a plurality of specially machined shapes of solid insulation, it reduces the amount of solid insulation required, it reduces the stress applied to the cooling ducts, and it uses all easily formed solid insulating members, which may be cast, if desired.

The inner and outer ends of each pancake coil include tight fitted channel shaped members 90 and 92, which have leg portions 94 and 96, and 93 and 95, respectively, which extend inwardly from a connecting or back portion 98. The connecting portion 98 of channel members 90 and 92 extend across the back portion 86 of channel members 80 and 82, and the leg portions of channel members 90 and 92 extend along the outer surfaces of insulating washer members 41 and 42 for a predetermined distance.

The first and last coils of the winding, such as coil 32, have an insulating washer member 100 disposed adjacent to and contacting the leg portions 95 and 96 of channel members 90 and 92, respectively, forming a duct 102 which should also have a maximum thickness of 3/16 of an inch. The thickness of the duct 102 is determined by the thickness of leg members 95 and 96. Duct 102, not being disposed adjacent one of the coil sections, need not be in communication with the inlet and outlet openings 46 and 48 in electrical winding 30.

Adjacent pancake coils, such as coils 32 and 54, are disposed in contacting relationship, with the leg members 94 and 93 of channel members 90 and 92 of coil 32 in contact with leg members 103 and 105, respectively, of the channel members 104 and 106 disposed on pancake coil 54. This arrangement creates a duct 110 between adjacent pancake coils. The combined thickness of leg members 94 and 103, and the combined thickness of leg members 93 and 105, should not exceed 3/16 of an inch, to provide a duct 110 having this maximum width. Duct 110, like duct 102, need not be in communication with the inlet and outlet openings 46 and 48 disposed in electrical winding structure 30. It is only necessary to insure that there is an opening to these ducts, such as ducts 102 and 110, to be able to remove any air therein and fill these ducts with the dielectric fluid.

Solid insulation, such as insulating member 112, may be disposed between the high and low voltage winding sections 60 and 62, respectively, which forms additional cooling ducts 114 and 116 between adjacent pancake coils.

Thus, between adjacent pancake coils, there are at least three ducts for the dielectric fluid, such as cooling duct 74 adjacent the outer surface of coil section 38, duct 110, and cooling duct 120 adjacent the first coil section of pancake coil 54. These ducts, which have a maximum width of 3/16 of an inch, distribute surge potentials across the winding and across the inner cooling ducts, such as cooling duct 66, more uniformly than arrangements which utilize all solid insulation between adjacent pancake coils. Thus, all of the insulation, solid and fluid, is more uniformly stressed, and the capacitive distribution of impulse voltages more nearly conforms with the inductive distribution, reducing transient voltage oscillations when the distribution of a surge of impulse potential across the winding changes from capacitive to inductive.

Figure 4:
FIG. 4 is a cross sectional view of a portion of a transformer, illustrating another embodiment of the invention.
Figure 4:
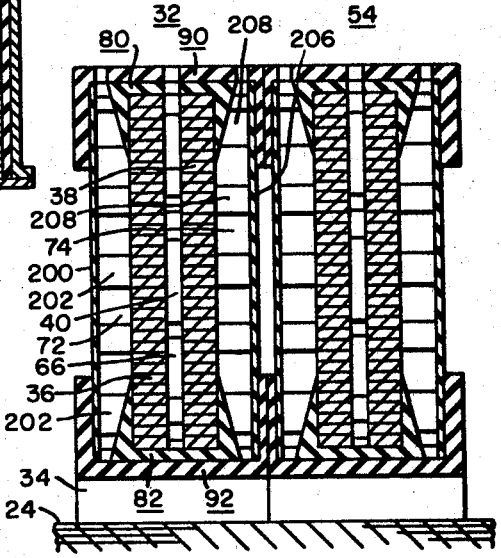

FIG. 4 is a cross sectional view of electrical coils and electrical insulation constructed according to another embodiment of the invention, with like reference numerals in FIGS. 2 and 4 indicating like components. The winding arrangement of FIG. 4 is similar to that of FIG. 2, except for the arrangement which forms the ducts adjacent the outer major surfaces of the coil sections of each pancake coil. In the arrangement of FIG. 2, this was accomplished with a washer member having tapered portions adjacent the tapered leg portions of the channel members 90 and 92 and spacer blocks having a uniform depth dimension. FIG. 4 illustrates an embodiment of the invention wherein a flat washer member having a uniform thickness is utilized, with the duct adjacent the tapered leg portions of channel members 90 and 92 being formed by tapered spacer members. The construction of FIG. 4 has a maximum cooling duct width of 1/4 of an inch and is, therefore, for use on lower voltage class apparatus than the arrangement of FIG. 2.

More specifically, a flat insulating washer member 200 is used to form cooling duct 72, which has a plurality of spacer members 202 attached thereto. The spacer members adjacent coil section 36 have a uniform depth or thickness dimension, while the spacer members adjacent the tapered leg portions of channel members 80 and 82 are tapered.

In like manner, cooling duct 74 is formed by a flat insulating washer member 206 having a uniform thickness, with a plurality of insulating spacer members 208 being secured thereto. The insulating spacer members 208 have a uniform thickness adjacent the coil section 38, and are tapered adjacent the tapered leg portions of channel members 80 and 82. The insulating spacer members 208, in order to taper the inlet and outlet openings, have a maximum depth dimension of 1/4 of an inch, with the tapered members being tapered from 1/4 of an inch to 1/8 of an inch. Thus, the inlet and outlet ducts in the highly stressed areas, are approximately 1/8 of an inch thick. With the arrangement shown in FIG. 4, it may be desirable to eliminate the channel members at the ends of the coils, such as channel member 90, in order to insure that the inlet and outlet openings to the winding structure do not close.

In summary, there has been disclosed a new and improved electrical transformer construction which utilizes pancake coils having divided coil sections, and tight fitting channel solid insulation disposed over the inner and outer coil edges, without the attendant disadvantages of prior art arrangements which utilize divided pancake coils and solid tight fitting channel members over the edges of the coils. All four major sides of each double coil arrangement are cooled by cooling ducts having a width which reduces stress concentrations in the cooling dielectric below the ionization level, and only one major side of each coil section is blanketed with the leg of the solid insulating channel, precluding hot spots from being developed due to the insulating channels. The legs of the insulating channels are terminated in cooling ducts without stress concentration, due to the tapered arrangement of the legs, and the cooling ducts are directed away from the high stress concentrations at the inner and outer edges of the coil. The insulating means for insulating the windings, both solid and fluid, is more uniformly stressed across the complete winding, which reduces stress concentrations in the lower dielectric constant fluid, and impulse voltages are more uniformly distributed across the winding, which reduces transient voltage oscillations when the impulse voltage distribution changes from capacitive to inductive.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. Electrical inductive apparatus comprising, a tank, electrical winding means disposed in said tank,
   fluid cooling means disposed in said tank,
   said electrical winding means including a plurality of pancake coils disposed in side-by-side relation.
   each of said pancake coils including at least first and second sections each having first and second major surfaces and an opening which extends between the first and second major surfaces, the first and second coil sections of each pancake coil being disposed with the second major surface of the first section adjacent to and spaced from the first major surface of the second section, forming a cooling duct for flow of said fluid cooling means adjacent said major surfaces of the coil sections,
   first solid insulating means disposed about the inner and outer edges of each of said pancake coils in a tight fitting relationship, said first solid insulating means also extending inwardly from the inner and outer edges of each pancake coil along the first major side of the first coil section and along the second major side of the second coil section for a predetermined distance, with the portion of said first solid insulating means which extends along said major surfaces being tapered to reduce its thickness as it progresses away from the inner and outer edges of said pancake coils, second solid insulating means disposed in spaced relation adjacent the first major side of said first coil section and the second major side of the second coil section, and adjacent the tapered portion of said first solid insulating means, forming cooling ducts for flow of said fluid cooling means adjacent said major surfaces of the coil sections.

2. The electrical inductive apparatus of claim 1 including third solid insulating means disposed about said first solid insulating means and a portion of said second solid insulating means in a tight fitting relationship.

3. The electrical inductive apparatus of claim 1 wherein said second solid insulating means is spaced from and is substantially parallel to the first major surface of the first coil section, the second major surface of the second coil section, and the tapered portions of said first means which extend along these major surfaces of the coil sections.

4. The electrical inductive apparatus of claim 3 wherein the width of the ducts formed adjacent the major sides of the first and second coil sections does not exceed $3/16$ of an inch.

5. The electrical inductive apparatus of claim 1 wherein said second solid insulating means includes a flat washer member having a uniform thickness and a plurality of spacer members secured thereto which space said second solid insulating means from the associated major surfaces of said first and second coil sections and the tapered portion of said first solid insulating means, said spacer members being tapered adjacent the tapered portion of said first solid insulating means.

6. The electrical inductive apparatus of claim 1 wherein said second solid insulating means includes a washer member which is tapered adjacent the tapered portion of said first solid insulating means, and a plurality of spacer members secured thereto which space said second solid insulating means from the associated major surfaces of the first and second coil sections and from the tapered portions of said first solid insulating means, said spacer members all having a substantially uniform thickness dimension.

7. The electrical inductive apparatus of claim 1 wherein said first solid insulating means is substantially channel-shaped, having tapered leg portions joined by a back portion.

8. The electrical inductive apparatus of claim 2 wherein the third solid insulating means separates adjacent pancake coils, forming ducts for said fluid cooling means between adjacent pancake coils.

9. The electrical inductive apparatus of claim 6 wherein the cooling ducts adjacent the major surfaces of said coil sections having a maximum thickness dimension of $3/16$ of an inch.

10. The electrical inductive apparatus of claim 5 wherein the cooling ducts adjacent the major surfaces of said coil sections have a maximum thickness dimension of $1/4$ of an inch.

References Cited
UNITED STATES PATENTS 3,183,460  5/1965  Bennon _____ 336—70 XR DARRELL L. CLAY, *Primary Examiner.*

T. J. KOZMA, *Assistant Examiner.*